United States Patent
Folk

[15] 3,650,098
[45] Mar. 21, 1972

[54] SEMI-MOUNTED MOWER FOR TRACTORS

[72] Inventor: Ralph D. Folk, R. R. 3, Huntington, Ind. 46750

[22] Filed: Nov. 4, 1970

[21] Appl. No.: 86,715

[52] U.S. Cl..............................................56/15.5, 56/15.6
[51] Int. Cl. ......................................................A01d 35/26
[58] Field of Search ......................56/14.7, 14.9, 15.1, 15.2, 56/15.5, 15.6, 6, 7, 11.9

[56] References Cited

UNITED STATES PATENTS 3,387,436  6/1968  Kasper..........................................56/6
1,291,392  1/1919  Burgess...............................56/14.7 X
2,906,084  9/1959  Weaver...................................56/14.7
3,043,074  7/1962  Christie et al..........................56/15.2

*Primary Examiner*—Louis G. Mancene
*Assistant Examiner*—J. N. Eskovitz
*Attorney*—Jeffers and Rickert

[57] ABSTRACT

A mower frame rests upon three wheels and is adapted to be secured to either side of a garden or yard tractor. The frame supports an engine powering mower blades. One of the three wheels is cranked or otherwise raised above the ground prior to use.

6 Claims, 3 Drawing Figures

PATENTED MAR 21 1972  3,650,098

INVENTOR.
RALPH D. FOLK

3,650,098

SEMI-MOUNTED MOWER FOR TRACTORS

SUMMARY OF THE INVENTION

A mower frame rests on two parallel vertical front wheels which differ in diameter and upon a smaller rear mounted vertical caster wheel. Means are provided for raising or lowering the smaller diameter front wheel. The frame carries an engine powering mower blades or other cutters. Separate axle and hitch bars secure the deck detachably to either the left side or right side of a garden or yard tractor having brackets suitably attached to the tractor.

In use, after the semi-mounted mower is connected, the smaller diameter front wheel is raised above ground whereby the weight originally supported by this wheel is borne by the tractor and the remaining weight is supported by the larger diameter front wheel and the rear wheel.

The user can then operate his tractor and turn, back, mow in corners, mow around trees and mow over uneven ground or roadsides. The user can start or stop the mower engine, or throw the motor of the mower in or out of gear to engage or disengage the cutters, while operating the tractor. Cable means can be employed to operate both the tractor engine and the mower engine from the tractor battery.

DETAILED DESCRIPTION OF PREFERRED EMBODIMENTS

Figure 1:
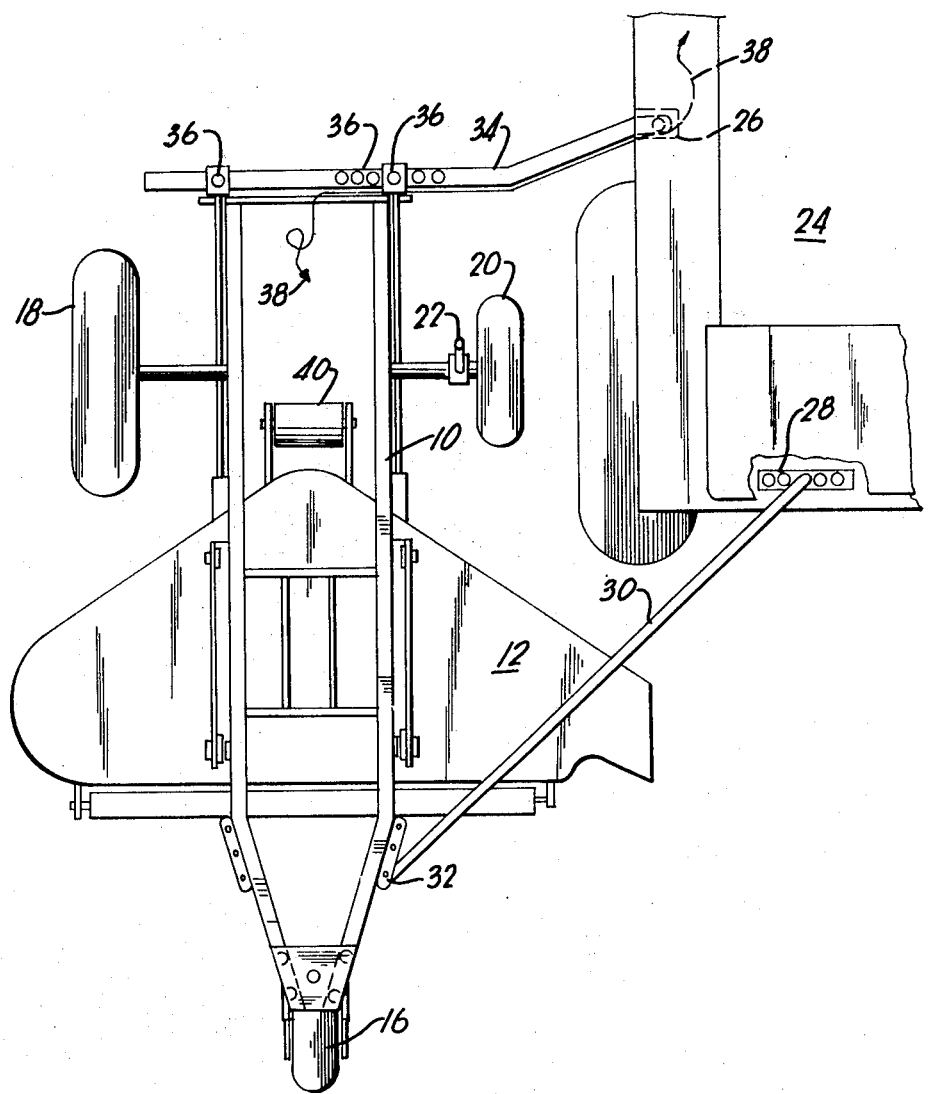
FIG. 1 is a top view of my invention.
Figure 2:
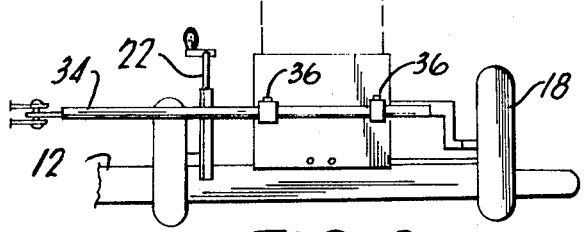
FIG. 2 is a front view thereof.
Figure 3:
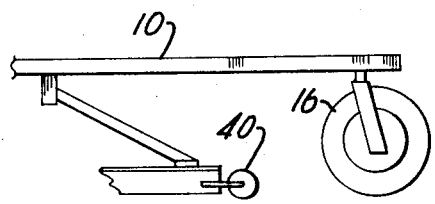
FIG. 3 is a fragmentary side view thereof.

Referring now to FIGS. 1–3, a rectangular frame 10 supports a mower deck 12 with an engine 14 thereontop and cutter blades or the like disposed therebelow. The frame rests on a rear disposed relatively small diameter caster wheel 16 and two front wheels 18 and 20 of different diameter. A manually operable crank 22 enables the smaller diameter wheel 20 to be raised or lowered as desired.

A tractor 24 has a side disposed bracket 26 and a rear disposed bracket 28. A push bar 30 is detachably engaged at one end with bracket 28 and at the other end with a bracket 32 on one side of the frame at the rear. A hitch bar 34 is detachably engaged at one end with bracket 26 and at the other end with a bracket 36 secured at the front of the frame. Bar 30 is pivotally secured to both bracket 32 and bracket 28.

A roller 40 disposed under the deck is adjustable for the length of cut.

The bar 34 can support a cable 38 connecting the battery of the tractor to the engine of the mower whereby both tractor and mower engines can be operated from the same battery.

While I have described my invention with particular reference to the drawings, such is not to be considered as limiting its actual scope.

Having thus described this invention, what is asserted as new is:

1. In combination with a garden tractor having side and rear brackets, an auxiliary mower having a frame and comprising in combination:
   an engine supported on said auxiliary mower frame;
   at least one mower blade supported by said auxiliary mower frame and coupled to said engine whereby said engine may supply power to said at least one mower blade;
   means for supporting said auxiliary mower frame comprising two front wheels and a rear wheel;
   one of said front wheels having a smaller diameter than the other front wheel, said one front wheel normally being raised when said auxiliary mower is coupled to said garden tractor and being lowered to support said auxiliary mower when said garden tractor is decoupled from said auxiliary mower;
   a hitch bar secured to the front of said auxiliary mower frame at one end and pivotally connected at the other end to said garden tractor side bracket; and
   a push bar connected at one end to said garden tractor rear bracket and at the other end to the rear and to one side of said auxiliary mower frame.

2. The combination of claim 1 further comprising a mower deck wherein said engine is supported above said mower deck and said at least one mower blade is disposed below said mower deck.

3. The combination of claim 1 wherein said rear wheel is a caster wheel.

4. The combination of claim 1 further comprising manually operated means for raising and lowering said one front wheel.

5. The combination of claim 2 further comprising adjustable roller means disposed lower than said deck and in contact with the ground for controlling the length of cut.

6. The combination of claim 4 further comprising adjustable roller means disposed lower than said engine and in contact with the ground for controlling the length of cut.

* * * * *